United States Patent

[11] 3,574,417

| [72] | Inventors | Donald W. Howard<br>South Bend, Ind.;<br>Ralph W. Carp, Baltimore, Md. |
|---|---|---|
| [21] | Appl. No. | 824,173 |
| [22] | Filed | May 13, 1969 |
| [45] | Patented | Apr. 13, 1971 |
| [73] | Assignee | The Bendix Corporation |

[54] FULL POWER ADAPTIVE BRAKING SYSTEM FOR USE WITH A PROPORTIONAL SOLENOID
37 Claims, 4 Drawing Figs.

| [52] | U.S. Cl. | 303/21, 303/20 |
|---|---|---|
| [51] | Int. Cl. | B60t 8/08 |
| [50] | Field of Search | 303/20, 21 |

[56] References Cited

UNITED STATES PATENTS

| 3,017,145 | 1/1962 | Yarber | 303/21(A4) |
|---|---|---|---|
| 3,398,994 | 8/1968 | Smith | 303/21(A4) |
| 3,398,995 | 8/1968 | Martin | 303/21(A4) |
| 3,498,682 | 3/1970 | Mueller et al. | 303/21(BB) |
| 3,499,689 | 3/1970 | Carp et al. | 303/21(A4) |

*Primary Examiner*—Duane A. Reger
*Attorneys*—Plante, Arens, Harts, Hix and Smith, Bruce L. Lamb, William G. Christoforo and Lester L. Hallacher ABSTRACT: An adaptive braking system for automotive vehicles and the like having full power hydraulic fluid brakes wherein the rotational speed of a wheel whose braking characteristics are to be controlled is electrically sensed and a DC voltage level proportional to wheel acceleration derived therefrom in an adaptive braking system control channel. Wheel acceleration is compared to various reference levels corresponding to predetermined values of wheel acceleration so as to generate error signals. The error signals are applied to voltage ramp generators which are thus energized to generate ramp voltages across a normally open proportional solenoid valve. The solenoid valve is interposed in the hydraulic fluid line between the braking system control valve and the controlled wheel and in response to the ramp voltages acts to modulate the hydraulic fluid pressure transmitted by the braking system control valve to the wheel brake cylinders.

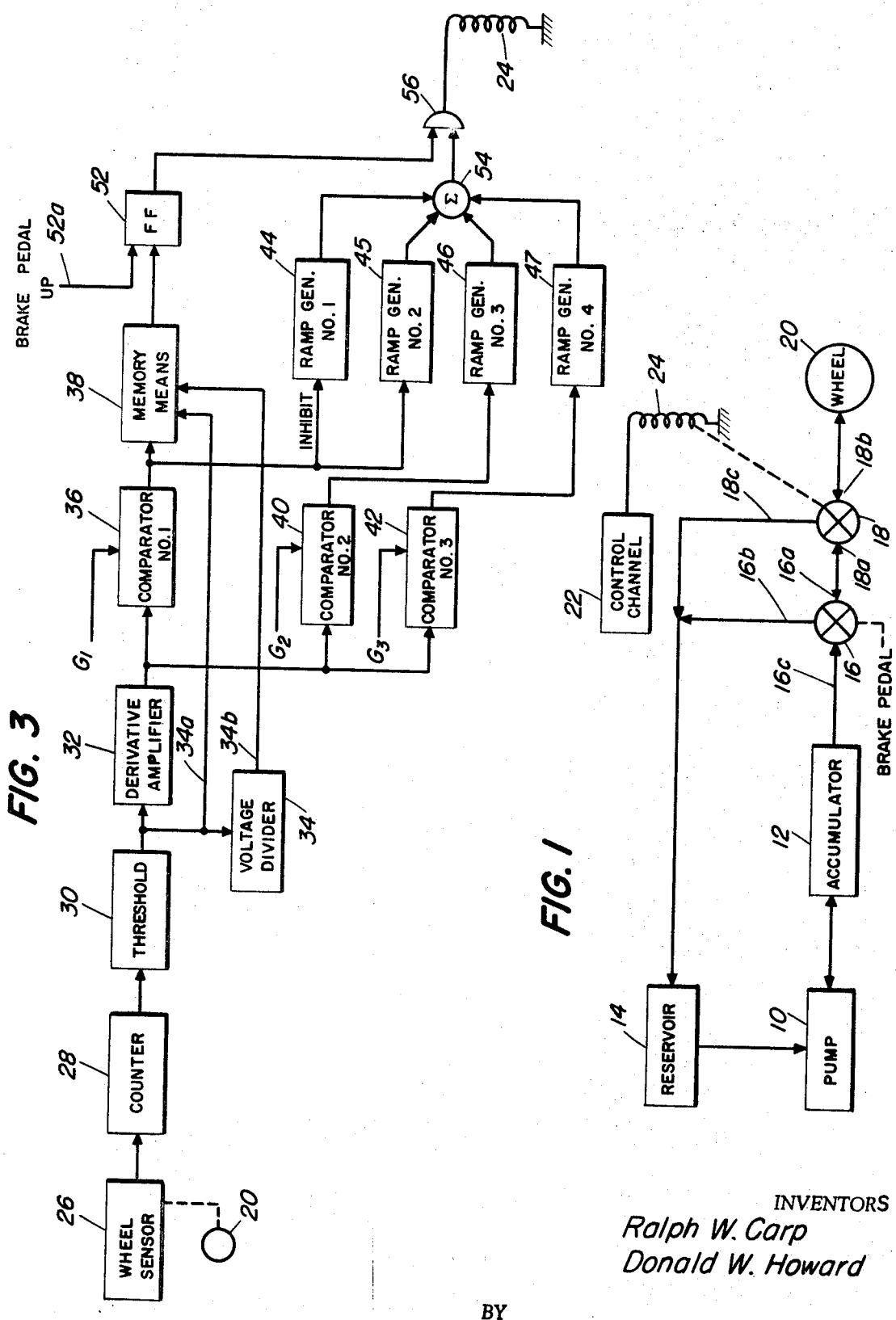

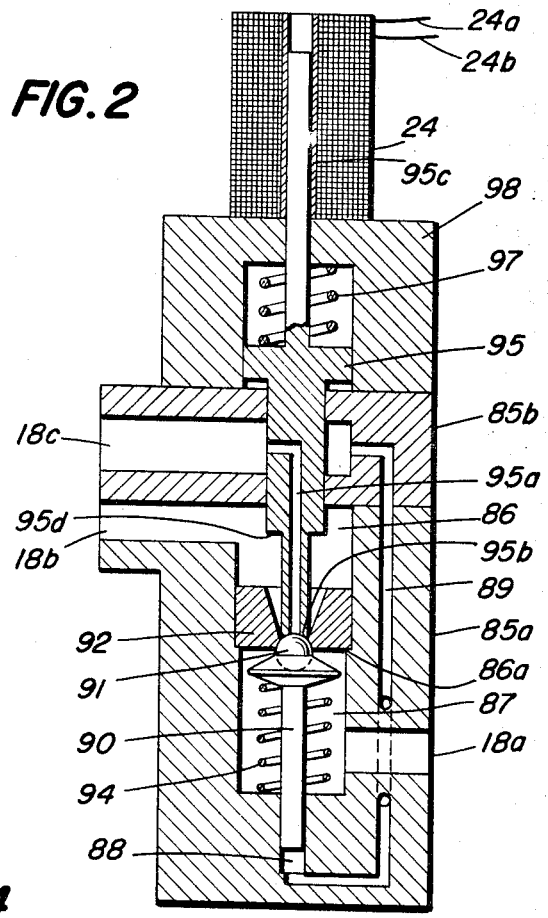
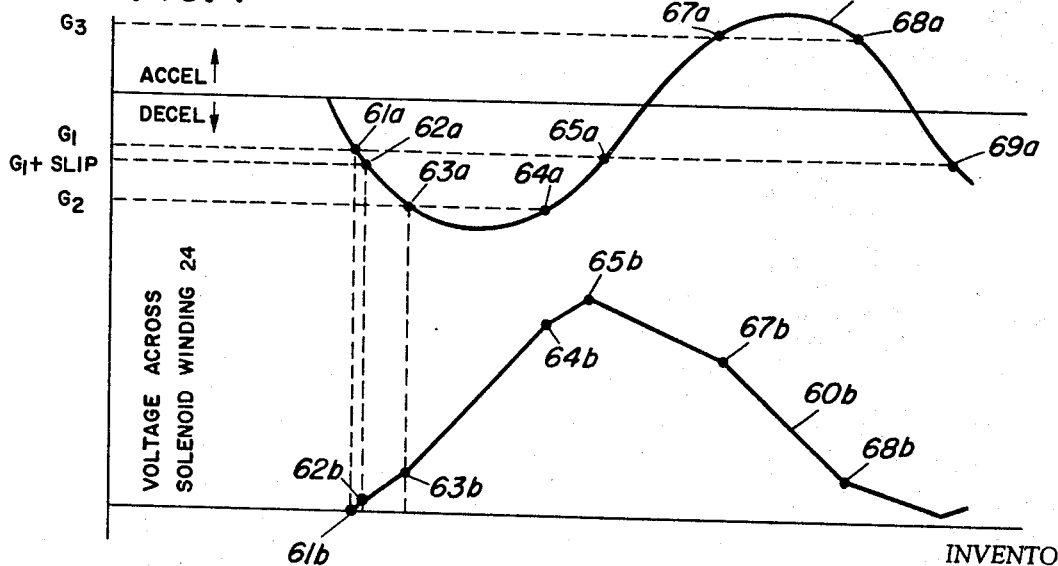

FULL POWER ADAPTIVE BRAKING SYSTEM FOR USE WITH A PROPORTIONAL SOLENOID

CROSS REFERENCE TO RELATED APPLICATION

Certain elements and concepts described herein with regard to adaptive braking systems were first described in a patent application, Ser. No. 712,672 for "Automotive Anti-Skid Control System" by Slavin et al., filed Mar. 13, 1968, now Pat. No. 3,494,671 and which is owned by the assignee of this application.

BACKGROUND OF THE INVENTION

This invention relates to adaptive braking systems for automobiles and the like and more particularly to an adaptive braking system for use with an automotive full power hydraulic braking system.

Full power hydraulic braking systems using hydraulic brake fluid are known which, briefly, consist of a hydraulic pump for developing hydraulic fluid pressure, an accumulator for storing the high-pressure hydraulic fluid, and a brake pedal-operated control valve for delivering the accumulated high-pressure hydraulic fluid to the wheel brake cylinders when the brake pedal is depressed, the brake fluid being delivered to the wheel brake cylinders at a pressure proportional to the brake pedal depressant force, and for returning the hydraulic fluid from the wheel brake cylinders to a low-pressure reservoir when the brake pedal is released.

It is well known that the wheel brake pressure which can be exerted by a motor vehicle operator is sufficient to cause the wheels to lock with resultant increase in stopping distance and reduce lateral vehicle stability. This is especially true when the coefficient of friction existing at the tire-road interface at the time of braking is low. It was shown in the aforementioned patent application that it is possible to optimize the braking characteristics of a wheeled vehicle under any tire-road interface conditions by providing the vehicle with an adaptive braking system which will modulate the hydraulic brake pressure to a pressure which will maximize the frictional force developed at the tire-road interface.

Mu-slip curves, which are graphs of the tire-road interface frictional force versus wheel slip where mu is the frictional force at the tire-road interface and slip is equal to unity minus the ratio of wheel speed to vehicle speed, are also well known in the art. These curves, which are empirically obtained, show a maximum mu in the range of 15 percent to 25 percent wheel slip. Height and sharpness at this maximum mu point are generally dependent upon the nature of the tire-road interface and its condition. It has been the object of true adaptive braking systems to modulate the braking pressure applied to the vehicle wheels so as to allow that wheel slippage which corresponds to the maximum mu point on the mu-slip curve for the conditions then encountered. Adaptive braking systems normally include means for monitoring wheel acceleration since it has been determined and shown in earlier studies that wheel acceleration parameters can be used in an adaptive braking system to control the wheel braking force to optimize the wheel braking characteristics. The word "acceleration" as used herein shall mean either positive or negative acceleration, that is, acceleration or deceleration as the meaning of the specification requires and should be obvious to one skilled in the art.

SUMMARY OF THE INVENTION

It is thus an object of this invention to provide an adaptive braking system for use on wheeled vehicles having a full power hydraulic braking system.

In certain previous adaptive braking systems automatic control of the vehicle brakes is provided only if wheel speed drops in a predetermined manner after wheel deceleration has attained some predetermined reference level in order to prevent false deceleration signals, such as might be caused by the wheel striking a chuck hole or railroad crossing during braking, from triggering the adaptive braking system. This wheel speed change constitutes a delay which tends to optimize further the vehicle braking characteristics; however, the structure of the delaying elements is such as to introduce the delay each time the wheel passes through the predetermined reference level during a controlled stop. Usually, it is necessary that this delay be provided only when the wheel first passes through the reference deceleration level, that is, only just prior to the adaptive braking system acquiring braking control. It is thus yet another object of this invention to provide means which will eliminate the aforementioned delay at subsequent movement of the wheel through the reference deceleration level once automatic braking control has been attained.

Another object of this invention is to provide an adaptive braking system which is fully compatible for use with conventional full power hydraulic braking systems.

A further object of this invention is to provide an adaptive braking system of the type described which requires no alternation of the basic full power braking system into which it is incorporated for proper operation thereof.

This new adaptive braking system makes use of a normally open proportional solenoid valve which is disposed in the brake hydraulic line between the braking system control valve and a controlled wheel's brake cylinders. The proportional solenoid valve allows communication of hydraulic fluid pressure through itself, with its outlet pressure being inversely proportional to the electrical voltage applied thereto. The voltage applied to the solenoid valve is generated by various voltage ramp generators energized in response to wheel acceleration signals.

It is thus one further object of this invention to provide an adaptive braking system which will cause braking pressure to be modulated in response to wheel acceleration signals.

BRIEF DESCRIPTION OF THE DRAWINGS

FIG. 1 is a flow diagram of a full power hydraulic system with the adaptive braking means of this invention included therein.

FIG. 2 is a drawing of a proportional three-way solenoid valve for use with this invention.

FIG. 3 is a block diagram of the invention.

FIG. 4 comprises plots of wheel acceleration and voltage ramp generator output signals taken during a controlled stop in a vehicle equipped with an embodiment of this invention.

DESCRIPTION OF THE PREFERRED EMBODIMENT

Referring to FIG. 1, there is seen a flow diagram of a basic full power hydraulic braking system including a pump 10, accumulator 12, reservoir 14, vehicle wheel 20 and braking system control valve 16. Reservoir 14 contains a store of hydraulic fluid at or near atmospheric pressure and supplies this fluid to pump 10 which is suitably powered by coupling to the vehicle drive system or which may optionally be powered from a separate power source such as an electric motor energized by the vehicle battery. The hydraulic fluid is pumped into accumulator 12 where it is stored under pressure. Pump 10 includes means, not shown, for limiting the pressure to which it will pump the hydraulic fluid. In addition to the basic full power braking system there is also seen the elements of the invention, namely, control channel 22, valve 18 and solenoid 24.

Braking solenoid proportional valve 18 normally allows free communication between braking system control valve 16 and wheel 20 in a manner to be explained in greater detail below. Control valve 16 is basically a proportional three-way valve, linked to and manually controlled by the vehicle brake pedal. Normally, (when the brake pedal is not depressed) valve port 16c is isolated and there is free communication between valve ports 16a and 16b. In other words, assuming that there is free communication between ports 18a and 18b across valve 18, the hydraulic fluid pressure in the brake cylinders at wheel 20 is released into reservoir 14 whenever the brake pedal is not depressed. If now the brake pedal is depressed, and assuming that winding 24 does not become energized, communication between ports 16a and 16b is interrupted and communication across valve 16 from ports 16c and 16a is established with the hydraulic pressure at port 16a being proportional to the force applied to the vehicle brake pedal, as is well known to those skilled in the automotive braking art. Subsequently increasing or decreasing vehicle brake pedal pressure will effect a proportionate increase or decrease of brake fluid pressure at port 16a and hence an increase or decrease of brake fluid pressure at the brake wheel cylinders of wheel 20.

The adaptive braking proportional solenoid valve 18 is also a three-way valve, somewhat similar to valve 16, and is illustrated in FIG. 2, reference to which should now be made. Valve bodies 85a and 85b have therein valve inlet port 18a, which is connected via a hydraulic fluid line to port 16a of valve 16, and outlet ports 18b and 18c connected via other hydraulic fluid lines to the wheel brake cylinders and to reservoir 14 respectively. A body cavity within valve body 85a is comprised of decreasingly smaller cylindrical cavities 86, 87 and 88, the later cavity being a bearing way for reaction plunger 90 which moves therein. Cavity 88 is placed in communication with outlet port 18c by means of a passage 89 found in the valve bodies 85a and 85b, whereby reaction plunger 90 is placed in a condition of substantial hydraulic balance. A stationary valve seat 92 is press fitted into cavity 86 against shoulder 86a. A ball valve 91 is permanently press fitted into reaction plunger 90 which in turn is biased by coil spring 94 to urge ball valve 91 against valve seat 92 so as to prevent fluid communication between body cavities 86 and 87, and hence preventing fluid communication between inlet port 18a and outlet port 18b. A reaction plunger 95 has a concave spherical valve seat 95b machined onto one end from which a plunger centrally located channel 95a communicates with outlet port 18c. Coil spring 97 located within reaction plunger way 98 normally biases reaction plunger 95 down so that valve seat 95b abuts ball valve 91 thus sealing channel 95a at that point and further, forcing ball valve 91 and balancing plunger 90 down against spring 94 and away from valve seat 92. Thus, in its normal condition valve 18, as aforementioned, permits free communication between valve 16 and the wheel brake cylinders of wheel 20, that is, through inlet port 18a and cavity 87, across the valve comprised of ball valve 91 and valve seat 92, then through cavity 86 and outlet port 18b.

Reaction plunger 95 has extending axially therefrom and partially into the helical axis of solenoid winding 24 a magnetic rod 95c. When solenoid winding 24 is energized from control channel 22 (FIG. 1) via electrical lines 24a and 24b, rod 95c is drawn into solenoid winding 24 by a solenoid force proportional to the signal across lines 24a and 24b, against spring 97. As reaction plunger 95 moves upward, balancing plunger 90 and valve ball 91 follow until ball valve 91 abuts and seals against valve seat 92 thus effectively isolating the three valve ports 18a, 18b and 18c from one another and establishing reaction plunger 95 in an equilibrium condition. Further solenoid force moves reaction plunger 95, and hence valve seat 95b, away from the now stationary ball valve 91 so that fluid communication is now established between valve port 18b and 18c through channel 95a. The braking fluid pressure at the brake cylinders of wheel 20 is now being released into reservoir 14 (FIG. 1).

Close examination of FIG. 2 reveals that the biasing force of spring 97 on reaction plunger 95 is balanced when equilibrium conditions are obtained by the solenoid force exerted by solenoid winding 24 and the fluid pressure acting on reaction plunger shoulder 95d. Thus, only sufficient fluid pressure will be relieved through channel 95a to reestablish equilibrium of forces on reaction plunger 95 so that valve seat 95b is once again sealed against ball valve 91. Of course, a decrease of solenoid force at this time would cause reaction plunger 95 to move downward against ball valve 91 to thus move ball valve 91 away from valve seat 92 to again allow fluid communication between inlet port 18a and outlet port 18b. It should now be obvious that once a certain threshold level of solenoid force is reached, the fluid pressure at the brake wheel cylinders is regulated by proportional solenoid valve 18 to be inversely proportional to solenoid force.

Referring now to FIG. 3, which is a block diagram of the invention, there is seen a wheel sensor 26 coupled to wheel 20, a counter 28, a threshold circuit 30, a derivative amplifier 32, a voltage divider 34, comparators 36, 40 and 42, and memory means 38, all of which elements have been previously described in aforementioned patent application Ser. No. 712,672. To briefly describe the function of these elements, wheel sensor 26 is mounted on and senses the rotational speed of a wheel whose braking characteristics are to be controlled, for example, wheel 20. Wheel speed sensor 26 generates pulses linearly related to wheel speed, which pulses are converted to a DC voltage level in counter 28, this voltage level being proportional to wheel rotational speed. The speed voltage is supplied to threshold 30 which generates no output as long as the wheel speed remains below a predetermined threshold value. In other words, threshold 30 suppresses all signals below a predetermined threshold, however, once the threshold value has been exceeded the threshold output is equal to its input voltage. The wheel speed voltage signal from the threshold is applied to derivative amplifier 32 which generates in response thereto a DC voltage level proportional to wheel acceleration (and deceleration). The resulting wheel acceleration signal is applied to comparators 36, 40 and 42 wherein it is compared to voltage levels proportional to predetermined acceleration levels $G_1$, $G_2$ and $G_3$.

Reference level $G_1$ is normally set to correspond to a wheel deceleration of approximately 1 $g$, it being known that when a wheel is decelerating at this rate it is operating past the peak of the mu-slip curve and antilock control of the wheel should be initiated if other conditions to be explained are also satisfied. Assuming now that the vehicle is braked and the wheel decelerates to $G_1$ reference level, comparator 36 will generate an error signal which triggers memory means 38. The memory means is fully described in the aforementioned patent application Ser. No. 712,672. Briefly, memory means 38 includes a memory capacitor across which is impressed a voltage proportional to a predetermined percentage of instantaneous wheel speed, this proportional voltage being that across line 34a and 34b, line 34a voltage being speed voltage from threshold 30 and the voltage on line 34b being the latter voltage as attenuated by voltage divider 34. Memory means 38 also includes a memory comparator means and a one-shot which is triggered by the comparator 36 output and which allows the memory comparator means to generate an output pulse if the wheel speed as indicated on line 34a drops to the predetermined percentage of memorized instantaneous wheel speed any time during the one-shot period.

If these conditions are met, that is, wheel deceleration exceeds the reference $G_1$ level and during the period of the memory means one-shot, wheel speed drops by a predetermined percentage, memory means 38 generates an output which resets flip-flop 52, which flip-flop reset signal qualifies AND gate 56.

Voltage ramp generators 44 to 47 are energized by comparator outputs and generate voltage ramps, when energized which are summed by voltage summing network 54, the voltage sums being applied through AND gate 56, if qualified, to solenoid winding 24 to decrease or increase the wheel cylinder braking pressure as previously explained.

FIG. 4 which comprises time plots of acceleration and deceleration levels (curve 60a) during a braked stop with lockup being imminent, along with simultaneous voltage levels across solenoid winding 24, (curve 60b) should now also be referred to so that the control cycle can be better understood. In our present example, wheel 20 has decelerated past the $G_1$ reference level (point 61a and 61b in FIG. 4), and comparator 36 has generated an output so that ramp generator 45 is energized and commences generating an increasing voltage ramp. At the same time, ramp generator 44, whose function will be explained later, is inhibited. Ramp generators 46 and 47 remain unenergized at this time since comparators 40 and 42 generate no output. Additionally, before AND gate 56 is qualified the output from ramp generator 45 is blocked from solenoid winding 24. When gate 56 becomes qualified it should be clear that ramp generator has been running for some short period of time so that there immediately appears across winding 24 a step voltage (point 62b) which then begins to ramp upward toward point 63b following the ramp generator 45 output. This increasing voltage across winding 24 causes the proportional solenoid valve 18 to decrease the hydraulic brake fluid pressure in the brake wheel cylinders of wheel 20.

This decreasing braking force will tend to relieve the wheel of imminent lockup; however, it is possible that the ramp voltage from ramp generator 45 is not sufficiently steep to entirely prevent lockup, so that wheel 20 continues to move towards a locked-up condition as evidenced by a continued increase in wheel deceleration (points 62a to 63a). Reference $G_2$ is set at a value of wheel deceleration greater than $G_1$ while the output of ramp voltage generator 46 taken with the output of ramp generator 45 is much steeper than the output of ramp generator 45 alone. Thus, if the wheel continues to decelerate past the $G_2$ reference level, as seen at point 63a, comparator 40 generates an output which energizes ramp generator 46 whose output ramp when summed with the output from ramp generator 45 causes the voltage across winding 24 to increase more rapidly, as seen between 63b and 64b, thus causing the hydraulic braking pressure at wheel 20 to decrease more rapidly. This last action obviously will cause wheel 20 deceleration to decrease back to the $G_2$ reference level (point 64a), thus extinguishing comparator 40 output and ramp generator 46 output so that at that time when wheel deceleration is between the $G_2$ and $G_1$ reference levels (points 64a and 65a), only ramp generator 45 is energized and once again the wheel brake pressure is being slowly relieved at a rate determined by the predetermined characteristics of ramp generator 45 (point 64b to 65b).

In response to the decreasing braking pressure, wheel deceleration will continue to decrease and the wheel will eventually fall below the $G_1$ reference level at which time ramp generator 45 will be extinguished and ramp generator 44 will be energized. Ramp generator 44 output (point 65b to 67b) is a slowly falling voltage ramp which will cause wheel brake pressure to slowly increase.

Reference $G_3$ (67a) is set at a predetermined value of wheel acceleration. Thus, if in spite of the slowly increasing wheel braking pressure, wheel deceleration continues to drop and the wheel actually accelerates past the $G_3$ reference level, comparator 42 output will energize ramp generator 47 whose ramp voltage falls steeply, so that this latter voltage ramp taken with the output from ramp generator 44 will cause wheel brake pressure to increase rapidly, (see point 67b to 68b). Wheel acceleration will thus peak and once again fall in response to the increasing braking pressure. At point 68a wheel deceleration drops below the $G_3$ reference level so that, as seen at 68b, ramp generator 47 is extinguished and only the slowly dropping ramp voltage output from ramp generator 44 is now effective. If wheel acceleration now drops below the $G_1$ reference level (point 69a) the cycle will be repeated.

If at any time during the adaptive braking cycle the vehicle operator terminates brake control by releasing the brake pedal a brake switch ganged to the brake pedal generates a signal which appears on line 52a thus causing flip-flop 52 to be set thereby extinguishing the flip-flop reset signal and closing gate 56. The voltage across solenoid winding 24 will thus completely disappear and proportional valve 18 will now allow full communication between control valve 16 and wheel 20. Additionally, at the completion of any adaptive braking cycle, ramp generator 44 will run down sufficiently to insure that the output of summing network 54 is at a base level before subsequent cycles of the adaptive braking system are generated.

Although the parameters outlined in this description, namely, the reference levels $G_1$, $G_2$ and $G_3$ and the voltage ramp outputs from ramp generators 44 to 47 have resulted in excellent braking characteristics in an adaptive braking system installed in an actual motor vehicle, it should be understood that these parameters may be varied by the system designer without departing from the teachings of this invention. Indeed, following the teachings of this invention, it should be obvious that one skilled in the art could not only vary these aforementioned parameters but could also increase or decrease the number of comparators and ramp generators thereby increasing or decreasing the amount of control over the braking system. It is also obvious that a plurality of adaptive braking channels like that shown in FIG. 2 may be installed in a single motor vehicle, with one channel being provided for each wheel whose braking characteristics are to be controlled. Teachings as to multiple controlled channel adaptive braking systems are also contained in the aforementioned patent application Ser. No. 712,672. Thus, although we have shown what we consider to be the preferred embodiment of our invention, certain other alterations and modifications will become apparent to one skilled in the art, so that we do not wish to limit our invention to the specific form shown. One example of an obvious modification of our invention is the use thereof in a conventional, nonfull power braking system where the pump 10, accumulator 12, and control valve 16 are replaced by the standard automotive braking system master cylinder and master cylinder reservoir, with fluid return from valve 18 being made to the master cylinder reservoir. Of course, this modification of my invention suitably requires a master cylinder of fairly large pressurized fluid capacity to prevent loss of fluid pressure after valve 18 has cycled a number of times since the quantity of pressurized fluid available during any one stop is limited by the amount of fluid trapped and pressured within the master cylinder when the brake pedal is depressed. Another obvious variation of my invention is the use of my latching device, as exemplified by flip-flop 52 and gate 56 in FIG. 3, to prevent the reinstitution of the memory period after the initial braking cycle in adaptive braking systems having memory means for delaying the start of automatic braking control. These further examples of obvious modifications, alterations, and adaptations of may invention are shown by way of illustration and not by way of limitation.

We claim:

1. In a vehicle having wheels braked by fluid means including a source of high-pressure brake fluid, braking means at said wheels responsive to said high-pressure brake fluid for braking said wheels, and a low-pressure brake fluid reservoir, an adaptive braking system for controlling the brake fluid pressure applied to the braking means at at least one said wheel comprising:

means responsive to the rotational speed of said wheel for generating wheel acceleration signals;

means for generating reference acceleration signals;

comparator means responsive to said reference acceleration signals and said wheel acceleration signals for generating comparator means output signals;

electrical ramp means responsive to said comparator means output signals for generating ramping electrical signals; and, a proportional solenoid fluid valve responsive to said ramping electrical signals and connected to said high-pressure brake fluid source, said braking means and said reservoir for allowing first fluid communication between said high-pressure brake fluid source and said braking means, and for allowing second fluid communication between said braking means and said reservoir.

2. An adaptive braking system as recited in claim 1 wherein said solenoid valve includes means normally biasing itself to allow said first fluid communication and to interrupt said second fluid communication and including:

brake switch means activated by the vehicle brake pedal for generating switching signals; and, gating means responsive to said switching signals and connected between said electrical ramp means and said solenoid valve for gating said ramping electrical signals to said solenoid valve.

3. An adaptive braking system as recited in claim 2 wherein said electrical ramp means includes at least one electrical ramp generator and means summing the outputs of all electrical ramp generators for generating said ramping electrical signal.

4. An adaptive braking system as recited in claim 2 wherein said electrical ramp means includes at least one voltage ramp generator and means summing the output of all said voltage ramp generators for generating a voltage ramp signal comprising said ramping electrical signal.

5. An adaptive braking system as recited in claim 4 wherein said solenoid fluid valve includes regulating means for controlling said brake fluid pressure at said braking means in response to said ramping electrical signal.

6. An adaptive braking system as recited in claim 5 wherein said brake fluid comprises brake hydraulic fluid.

7. In a vehicle having wheels braked by a brake fluid means including a source of high-pressure brake fluid, braking means for at least a first wheel responsive to said high-pressure brake fluid for braking said first wheel and a low-pressure brake fluid reservoir, an adaptive braking system for controlling the brake fluid pressure at braking means comprising:
 means for generating a first electrical signal proportional to rotational speed of said first wheel;
 means responsive to said first electrical signal for generating a second electrical signal proportional to the acceleration of said first wheel;
 at least one source of reference electrical signals;
 at least one comparator for comparing said second electrical signal with said reference electrical signals to generate comparator output signals;
 means for generating a third electrical signal proportional to said first electrical signal;
 memory means responsive to said comparator output signals for storing the instantaneous value of said third electrical signal during a predetermined time period;
 memory comparator means responsive to said first electrical signal and said stored electrical signal for generating a gate open signal;
 at least one voltage ramp generator responsive to said comparator output signals for generating a voltage ramp;
 a three-way proportional solenoid fluid valve responsive to said voltage ramp for allowing first fluid communication between said high-pressure brake fluid source and braking means for allowing second fluid communication between said wheel braking means and said reservoir; generating
 gating means responsive to said gate open signal for applying said voltage ramp to said solenoid valve.

8. An adaptive braking system as recited in claim 7 with additionally a brake switch responsive to vehicle brake pedal force for generating a brake switch signal and wherein said memory comparator means comprises:
 a memory comparator responsive to said first electrical signal and said stored electrical signal for generator a memory output signal; and
 latching means responsive to said memory output signal for generating said gate open signal and responsive to said brake switch signal for extinguishing said gate open signal.

9. An adaptive braking system as recited in claim 7 with additionally a voltage summing means interposed between said at least one comparator and said solenoid valve for summing all said comparator output signals.

10. An adaptive braking system as recited in claim 9 with additionally:
 a brake switch responsive to the vehicle brake pedal position for generating a brake switch signal; and wherein said memory comparator means comprises:
 a memory comparator responsive to said first electrical signal and said stored electrical signal for generating a memory output signal; and
 latching means responsive to said memory output signal for generating said gate open signal and responsive to said brake switch signal for extinguishing said gate open signal.

11. In a vehicle having a brake switch operable by a brake pedal for generating switch signals and wheels braked by a brake fluid means including a source of high-pressure brake fluid, braking means for at least a first wheel responsive to application of said high-pressure fluid thereto for braking at least said first wheel, and a low-pressure brake fluid reservoir, an adaptive braking system for controlling the brake fluid pressure at said braking means comprising:
 means for generating a first electrical signal proportional to rotational speed of said first wheel;
 means for generating a second electrical signal proportional to rotational acceleration of said first wheel;
 a source of a first reference signal;
 a first comparator for comparing said second electrical signal with said first reference signal to generate a first comparator output signal;
 a first voltage ramp generator responsive to said first comparator output for generating a first voltage ramp; and
 proportional solenoid fluid valve means responsive to said first voltage ramp for allowing first fluid communication between said high-pressure brake fluid source and at least said first wheel braking means and for allowing second fluid communication between at least said first wheel braking means and said reservoir.

12. An adaptive braking system as recited in claim 11 with additionally:
 a source of a plurality of other reference signals;
 a plurality of other comparators, each of said other comparators for comparing said second electrical signal with a different one of said plurality of other reference signals to generate other comparator output signals;
 a plurality of other voltage ramp generators for generating other voltage ramps; and
 means for summing all said voltage ramps, said solenoid fluid valve means being responsive to said summed voltage ramps.

13. An adaptive braking system as recited in claim 12 with additionally:
 means for generating a third electrical signal proportional to said first electrical signal;
 means responsive to said first comparator output signal for storing a sampled portion of the instantaneous value of said third electrical signal;
 means for comparing said stored signal with said first electrical signal for generating a gate open signal; and
 gating means responsive to said gate open signal for applying said summed voltage ramp to said solenoid fluid valve means.

14. An adaptive braking system as recited in claim 13 wherein said means for comparing said stored signal with said first electrical signal includes a latching means responsive to said comparison for generating said gate open signal and responsive to said switch signals for extinguishing said gate open signal.

15. An adaptive braking system as recited in claim 14 wherein said solenoid fluid valve means includes pressure regulating means responsive to the magnitude of the voltage ramp applied thereto for controlling the fluid pressure at said wheel braking means.

16. An adaptive braking system as recited in claim 15 wherein said summing means operates from a predetermined base voltage level and with additionally a second voltage ramp generator responsive to said first comparator output signal for generating a second voltage ramp of opposite slope from said first voltage ramp, said second voltage ramp being also summed with all other voltage ramps in said summing means.

17. An adaptive braking system as recited in claim 16 wherein said brake fluid comprises hydraulic brake fluid.

18. In a wheeled vehicle having operator-controlled brakes including a manual brake actuator and switching means for generating a brake switch signal in response to actuation of said manual brake actuator and braking means for at least one said wheel, an adaptive braking system for automatically controlling said braking means by a control signal in preference to said operator control comprising:
first means responsive to said control signal for terminating said operator brake control and providing automatic brake control;
gating means responsive to a gate open signal for communicating said control signal to said first means;
means responsive to rotation of at least one said wheel for generating a first electrical signal;
means for generating a reference electrical signal;
means responsive to said reference electrical signal and said first electrical signal for generating said control signal and a latching signal; and
bistable means responsive to said latching signal and said brake switch signal for generating said gate open signal.

19. An adaptive braking system as recited in claim 18 wherein said means for generating a first electrical signal comprises means for generating a first electrical signal correlative to wheel rotational speed and said means for generating said control signal and said latching signal comprises:
means responsive to said first electrical signal for generating a second electrical signal correlative to wheel acceleration;
comparator means responsive to said second electrical signal and said reference electrical signal for generating a comparator output signal;
means responsive to said comparator output signal for generating said control signal; and
means responsive to said comparator output signal and said first electrical signal for generating said latching signal.

20. An adaptive braking system as recited in claim 19 wherein said means for generating said latching signal comprises:
a signal attenuator for altering said first electrical signal in a predetermined manner; and
memory means responsive to said comparator output signal for memorizing said altered first electrical signal and including a memory comparator responsive to said memorized signal and said first electrical signal for generating said latching signal.

21. An adaptive braking system as recited in claim 20 wherein said memory means additionally comprises a memory comparator enabling means responsive to said comparator output signal for enabling said memory comparator during a predetermined time period and thereafter disabling said memory comparator.

22. An adaptive braking system as recited in claim 21 wherein said latching signal triggers said bistable means to a first state and said brake switch signal generated when said manual brake actuator is released by said vehicle operator triggers said bistable means to a second state, the signal generated by said bistable means when in said first state comprising said gate open signal.

23. An adaptive braking system for a vehicle wheel comprising:
means for applying a braking force to said vehicle wheel;
means for generating a first electrical signal correlative to acceleration of said vehicle wheel;
a source of a first reference electrical signal;
first means comparing said first electrical signal with said first reference electrical signal for generating a first error signal; and
means for attenuating said braking force in proportion to the time duration of said first error signal.

24. An adaptive braking system as recited in claim 23 wherein said attenuating means comprises:
first ramp means for generating a first control signal whose magnitude is essentially proportional to the time duration of said first error signal; and
means proportionally responsive to said first control signal for attenuating said braking force.

25. An adaptive braking system as recited in claim 23 with additionally:
a source of a second reference electrical signal; and
second means comparing said first electrical signal and said second reference electrical signal for generating a second error signal; and wherein said means for attenuating said braking force includes means for summing the time duration of said first and second error signals, said attenuating means being responsive to said sum.

26. An adaptive braking system as recited in claim 25 wherein said attenuating means comprises:
first ramp means for generating a first control signal whose magnitude is essentially proportional to the time duration of said first error signal;
second ramp means for generating a second control signal whose magnitude is essentially proportional to the time duration of said second error signal;
means for summing said first and second control signals; and
means proportionally responsive to the sum of said first and second control signals for attenuating said braking force.

27. An adaptive braking system as recited in claim 23 with additionally:
sources of other reference electrical signals; and
other means comparing said first electrical signal with said other reference electrical signals for generating other error signals, said attenuating means being proportionally responsive to the sum of the time duration of all said error signals.

28. An adaptive braking system as recited in claim 27 wherein said attenuating means comprises:
first ramp means for generating a first control signal whose magnitude is essentially proportional to the time duration of said first error signal;
other ramp means for generating other control signals whose magnitudes are essentially proportional to the time duration of said other error signals;
means for summing all said control signals;
means proportionally responsive to the sum of all said control signals for attenuating said braking force; and
means for connecting said summing means to said attenuating means.

29. An adaptive braking system as recited in claim 28 with additionally means for generating a speed electrical signal correlative to said vehicle wheel speed, said connecting means being responsive to said speed electrical signal.

30. An adaptive braking system as recited in claim 29 wherein said connecting means comprises:
latching means responsive to said speed electrical signal for generating a gate open signal and responsive to inactivation of said applying means for generating a gate close signal; and
gating means responsive to said gate open and gate close signal for communicating said sum to said attenuating means.

31. In a vehicle having wheels braked by a braking force including a source of said braking force, braking means for at least a first wheel responsive to application of said braking force thereto for braking at least said first wheel, an adaptive braking system including means for generating error signals when acceleration of said braked wheel attains predetermined reference levels, said adaptive braking system additionally comprising:
ramp generator means responsive to said error signals for generating a ramping signal; and
valve means for controllably applying said braking force to said braking means in proportional response to said ramping signal.

32. An adaptive braking system as recited in claim 31 wherein said ramp generator means comprises:
- a plurality of ramp generators for generating voltage ramps of predetermined slopes in response to said error signals; and
- means for summing said voltage ramps, said summed ramps comprising said ramping signal, and wherein said valve means comprises a proportional solenoid valve means normally allowing said braking force to be freely applied to said braking means for maintaining said applied braking force at a level proportional to the magnitude of said ramping signal.

33. An adaptive braking system as recited in claim 31 with additionally means responsive to said error signals and subsequent dynamic performance of said braked wheel for generating a latching signal;
- latching means responsive to said latching signal for generating a gate open signal; and
- gating means responsive to said gate open signal for applying said ramping signal to said valve means.

34. An adaptive braking system as recited in claim 33 wherein said vehicle includes vehicle operator activated means for applying said braking force to said braking means whereby said vehicle operator controls the braking characteristics of said vehicle, said adaptive braking system being arranged to preempt braking control of said vehicle when said gating means is open, and wherein said latching means is triggered to extinguish said gate open signal by said vehicle operator activated means.

35. An adaptive braking system as recited in claim 34 wherein said vehicle operator controlled means generates an unlatching signal upon its inactivation by said vehicle operator and wherein said latching means comprises a bistable element triggered to a first stable state by said latching signal wherein said gate open signal is generated and to a second stable state by said unlatching signal wherein said gate open signal is extinguished.

36. In a vehicle having means for generating a vehicle operator signal and wheels braked by braking pressure and including a source of said braking pressure, braking means for at least a first wheel responsive to said braking pressure applied thereto for braking at least said first wheel, and, means normally controlled by said vehicle operator signal for applying said braking pressure to said braking means, an adaptive braking system for generating a control signal in response to at least said first wheel attaining predetermined wheel dynamic parameters during generation of said vehicle operator signal and means responsive to said control signal for controlling the braking pressure at said braking means, said adaptive braking system additionally comprising:
- gate means for applying said control signal to said means responsive to said control signal; and
- latching means responsive to said control signal for applying a gate open signal to said gate means.

37. An adaptive braking system as recited in claim 36 wherein said latching means comprises a bistable element triggered by said control signal to generate said gate open signal and triggered by said vehicle operator signal to extinguish said gate open signal.